US010324230B2

(12) United States Patent
Kuchuk et al.

(10) Patent No.: US 10,324,230 B2
(45) Date of Patent: Jun. 18, 2019

(54) INTEGRATED INTERPRETATION OF PRESSURE AND RATE TRANSIENTS FOR PRODUCTION FORECASTING

(71) Applicant: SCHLUMBERGER TECHNOLOGY CORPORATION, Sugar Land, TX (US)

(72) Inventors: Fikri John Kuchuk, Meudon (FR); Anthony J. Fitzpatrick, Le Vesinet (FR); Sukru Sarac, Le Plessis Robinson (FR); Kirsty Morton, Meudon (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 503 days.

(21) Appl. No.: 14/924,031

(22) Filed: Oct. 27, 2015

(65) Prior Publication Data

US 2016/0116638 A1 Apr. 28, 2016

(30) Foreign Application Priority Data

Oct. 28, 2014 (EP) .................................... 14290325

(51) Int. Cl.
*G01V 99/00* (2009.01)
*G06Q 10/04* (2012.01)
(Continued)

(52) U.S. Cl.
CPC .......... *G01V 99/005* (2013.01); *E21B 49/008* (2013.01); *G06Q 10/04* (2013.01); *G06Q 50/02* (2013.01)

(58) Field of Classification Search
CPC .... G01V 99/005; E21B 49/008; G06Q 10/04; G06Q 50/02
(Continued)

(56) References Cited

U.S. PATENT DOCUMENTS 8,731,892 B2 * 5/2014 Al-Shammari ..... G06F 17/5009
703/10
2003/0225522 A1 12/2003 Poe
(Continued)

FOREIGN PATENT DOCUMENTS

WO 2009114463 A2 9/2009
WO 2011019565 A2 2/2011

OTHER PUBLICATIONS

Biryukov et al., "Pressure transient solutions to mixed boundary value problems for partially open wellbore geometries in porous media", Journal of Petroleum Science and Engineering, vol. 96-97, 2012, pp. 162-175.
(Continued)

*Primary Examiner* — Jami Valentine Miller
(74) *Attorney, Agent, or Firm* — Cameron R. Sneddon; Lee Eubanks

(57) ABSTRACT

Techniques for modelling a production forecast for a well are described. In one embodiment, a method includes calibrating a geological reservoir model by analyzing pressure transient well tests, fitting the geological reservoir model to pressure data to estimate model parameters, and building a simulated history of bottom hole pressure based on the model and measured transient flow data. The calibrating may further include fitting the model to flow rate data, using measured and simulated pressure data as input, to estimate model parameters, and then building a simulated history of downhole flow rate based on the model and change in measured pressure data. The calibrated model can be used to forecast future well production. Additional methods, systems, and devices are also disclosed.

20 Claims, 5 Drawing Sheets

(51) Int. Cl.
*E21B 49/00* (2006.01)
*G06Q 50/02* (2012.01)

(58) Field of Classification Search
USPC .......................................................... 703/10
See application file for complete search history.

(56) References Cited

U.S. PATENT DOCUMENTS

| | | | |
|---|---|---|---|
| 2007/0162235 A1 | 7/2007 | Zhan et al. | |
| 2011/0130966 A1 | 6/2011 | Zhan et al. | |
| 2016/0208599 A1* | 7/2016 | Rahman | E21B 47/0005 |
| 2016/0222765 A1* | 8/2016 | Nooruddin | E21B 41/0092 |

OTHER PUBLICATIONS

Biryukov et al., "Transient Pressure Behavior of Reservoirs with Discrete Conductive Faults and Fractures", Transport in Porous Media, vol. 95, 2012, pp. 239-268.
Booth et al., "Grid-Based Inversion of Pressure Transient Test Data", Presented at ECMOR XII—12th European Conference on the Mathematics of Oil Recovery, Sep. 6-9, 2010, Oxford, GB.
Booth et al., "Grid-based Inversion of Pressure Transient Test Data With Stochastic Gradient Techniques", International Journal for Uncertainty Quantification, vol. 2, No. 4, 2012, pp. 323-339.
Cipolla et al., "Seismic-to-Simulation for Unconventional Reservoir Development", SPE 146876 presented at the SPE Reservoir Characterisation and Simulation Conference and Exhibition, Abu Dhabi, UAE, Oct. 9-11, 2011.
de Brito Nogueira et al., "Integrated Workflow Characterizes Campos Basin Fractured Reservoirs Using Pressure-Transient Tests", World Oil, Feb. 2013, pp. 103-106.
Kuchuk et al, "Transient Pressure Test Interpretation for Continuously and Discretely Fractured Reservoirs", SPE158096 presented at the SPE Annual Technical Conference and Exhibition, San Antonio, TX, Oct. 8-10, 2012.
Morton et al., "Global Sensitivity Analysis for Natural Fracture Geological Modeling Parameters from Pressure Transient Tests", SPE 164894 presented at the EAGE Annual Conference & Exhibition, London, GB, Jun. 10-13, 2013.
Morton et al., "Grid-Based Inversion Methods for Spatial Feature Identification and Parameter Estimation from Pressure Transient Tests", SPE 142996 presented at the SPE EUROPEC/EAGE Annual Conference and Exhibition, Vienna, AT, May 23-26, 2011.
Morton et al., "Integrated Interpretation for Pressure Transient Tests in Discretely Fractured Reservoirs", SPE 154531 presented at the EAGE Annual Conference & Exhibition incorporating SPE EUROPEC, Copenhagen, DK, Jun. 4-7, 2012.
F. Kucuk et al., "Analysis of Simultaneously Measured and Sandface Flow Rate in Transient Well Testing (includes associated papers 13937 and 14693)" Journal of Petroleum Technology., vol. 37, No. 02m Feb. 1, 1985, pp. 323-334.
Extended Search Report issued in the related EP application 15003061.7 dated Nov. 4, 2016 (9 pages).

* cited by examiner

INTEGRATED INTERPRETATION OF PRESSURE AND RATE TRANSIENTS FOR PRODUCTION FORECASTING

BACKGROUND

This disclosure relates to methods and systems for well testing, and more particularly to a system and method for well test interpretation and a combination of analysis techniques with other earth science data.

DESCRIPTION OF THE RELATED ART

In any subsurface exploration and development, indirect measurements such as detailed geological description, outcrop data, etc., and direct measurements such as seismic, cores, logs, and fluid samples, etc., provide useful information for static and dynamic reservoir description, simulation, and forecasting. However, core and log data delineate rock properties just in the vicinity of the wellbore while geological and seismic data often are not directly related to formation permeability. Pressure transient tests provide dynamic information about reservoir pressure which can be used to estimate rock properties and fluid distributions and fluid samples for well productivity and dynamic reservoir description. Therefore, such tests are very useful for exploration environments as well as for general production and reservoir engineering.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a method for well production forecasting using a geological reservoir model and measured transient flow rate and pressure data includes calibrating the geological reservoir model. This calibrating includes analyzing a series of pressure transient well tests providing measured transient flow rate and pressure data for a well. The calibrating further includes fitting the geological reservoir model to the measured transient pressure data using the measured transient flow rate as input to estimate a first set of parameters for the geological reservoir model, and then building a simulated history of bottom hole pressure for the well based on the geological reservoir model and the measured transient flow rate data. Also, the calibrating includes fitting the geological reservoir model to the measured transient flow rate data using the measured transient pressure data and the simulated history of bottom hole pressure as input to estimate a second set of parameters for the geological reservoir model, followed by building a simulated history of downhole flow rate for the well based on the geological reservoir model and change in the measured transient pressure data. The method also includes forecasting future production from the well using the calibrated geological reservoir model.

In another embodiment of the present disclosure, an apparatus includes a programmed computer for analyzing a series of pressure build-up and/or drawdown well tests for a well to a given time using a measured rate history. The computer is also programmed to determine a system type of a geological reservoir model, to determine model parameters for the geological reservoir model using a maximum likelihood estimator, and to build a history of the well bottom hole pressure using a pressure convolution equation. Further, the computer is programmed to analyze the series of pressure build-up and/or drawdown well tests to the given time using pressure data as input to determine the system type of the geological reservoir model, and to determine model parameters for the geological reservoir model using the maximum likelihood estimator with measured flow rates a target of the maximum likelihood estimator. The pressure data used as input includes pressures measured during the pressure build-up and/or drawdown well tests, as well as simulated pressures from the history of the well bottom hole pressure built using the pressure convolution equation. Further still, the computer is programmed to build a history of the well downhole flow rate using a rate convolution equation, and to forecast future well production using the geological reservoir model.

In another embodiment, a method for modelling a production forecast for a well using a geological reservoir model includes analyzing a series of pressure build-up and/or drawdown well tests to a given time using a measured rate history, determining a system type of the geological reservoir model, determining model parameters for the geological reservoir model using a maximum likelihood estimator, and building a history of the well bottom hole pressure using a pressure convolution equation. The method also includes analyzing the series of pressure build-up and/or drawdown well tests to the given time using pressure data as input to determine the system type of the well, and determining model parameters for the geological reservoir model using the maximum likelihood estimator with measured flow rates a target of the maximum likelihood estimator. The pressure data used as input includes both pressures measured during the pressure build-up and/or drawdown well tests and simulated pressures from the history of the well bottom hole pressure built using the pressure convolution equation. The method further includes building a history of the well downhole flow rate using a rate convolution equation. Additionally, the method includes using the geological reservoir model to forecast future production from the well.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

Certain embodiments of the inventive concepts will hereafter be described with reference to the accompanying drawings, wherein like reference numerals denote like elements. It should be understood, however, that the accompanying figures illustrate the various implementations described herein and are not meant to limit the scope of the various technologies described herein.

DETAILED DESCRIPTION

Figure 1:
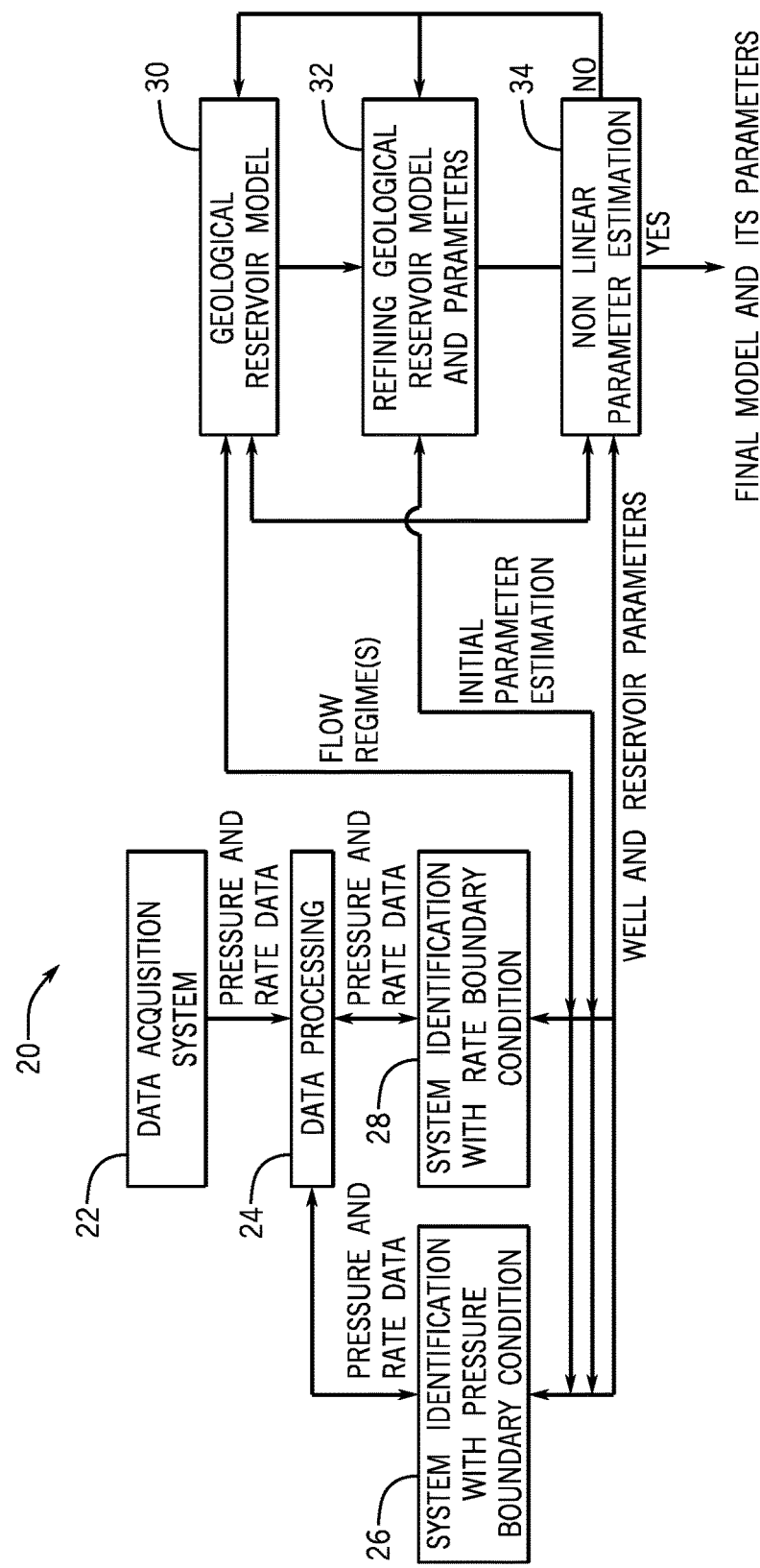
FIG. 1 shows a schematic diagram of a method for modelling a reservoir in accordance with the present disclosure.

Specific embodiments of the inventive concepts disclosed herein will now be described in detail with reference to the accompanying drawings. Further, in the following detailed description of embodiments of the present disclosure, numerous specific details are set forth in order to provide a more thorough understanding of the disclosure. However, it will be apparent to one of ordinary skill in the art that the embodiments disclosed herein may be practiced without these specific details. In other instances, well-known features have not been described in detail to avoid unnecessarily complicating the description.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

In the following description, numerous details are set forth to provide an understanding of the present disclosure. However, it will be understood by those skilled in the art that the embodiments of the present disclosure may be practiced without these details and that numerous variations or modifications from the described embodiments may be possible.

This disclosure describes a new method of improving the confidence in the parameters and description of a Reservoir Model derived from Well Test Transient Analysis. The method includes performing a conventional Pressure Transient Analysis (PTA) and identifying the model and a set of parameters (permeability, location of boundaries, fracture size and distribution, etc.) that most closely matches the measured pressure data. Typically a Pressure Buildup analysis is performed due to the confidence in the measured rate (identically zero). In this analysis the measured rate data is imposed as a boundary condition on the well over time. In other words it is the change in rate at the well head that induces a pressure disturbance in the reservoir.

In accordance with at least some embodiments, this method also includes using the downhole pressure as the boundary condition on the well, in which it is the pressure changes at the perforations that are deemed responsible for the disturbance moving through the reservoir. This technique, which may be called Rate Transient Analysis (RTA), uses the measured pressure data to produce simulated rate-versus-time data that is adjusted during system identification of a modelling process (e.g., the process described below with respect to FIG. 1) to match the measured rate data. In at least some instances, the PTA and RTA techniques are run iteratively until their results agree to produce a more robust and accurate reservoir model and associated parameters. The model with these more accurate parameters is then used for production prediction.

FIG. 1 illustrates a general overview of some methods according to embodiments described herein that may be used to gather, model, analyze, and interpret the data measured during well tests (e.g., pressure transient tests and production tests) along with other types data to determine a final geological reservoir model and formation properties. More specifically, FIG. 1 is a diagram 20 that generally represents a procedure for collecting pressure and rate data from a well with a data acquisition system (block 22) and using it to extract the values of reservoir parameters of interest. Due to the non-linear nature of the physical processes (e.g., complex flow in the wellbore, complex rock-fluid interaction, and uncertainties about the reservoir geology), this can be an iterative procedure in which initial guesses at the parameter values are refined.

Various data can be processed (block 24), such as pressure and flow rate data (which can be provided as log-log plots), and used for system identification (blocks 26 and 28). This system identification can include identifying reservoir or formation features, such as a particular flow regime (linear, radial, bounded, wellbore storage dominated, etc.), and estimating well and reservoir parameters. In at least some embodiments, and as generally depicted in FIG. 1, PTA and RTA techniques may be used together, and system identification can be performed with pressure imposed as a boundary condition (block 26) and with rate imposed as a boundary condition (block 28). Once the system characteristics are understood, parameters dominating the flow during each regime can be inferred and refined. Use can be made of regression software to alter the parameter values to most closely fit the data (blocks 30, 32, 34).

Conventional well tests have traditionally been used to obtain spatial distributions of the formation permeability, pressure, and other well and reservoir parameters based on the history matching of the pressure data to an analytical or simple numerical model selected to most closely represent the flow regimes observed from diagnostic plots.

Similarly, tests can be performed (often in the production environment) where the permeability and pressure in the formation is based on the automatic history matching of the rate data. Although these approaches may be mathematically similar, the metrology of the measurement devices and the fluctuations of the measurements with time differ and the system identification technique and its parameters may differ. This disclosure proposes a technique to reconcile these differences by converging on a maximum likelihood model.

Pressure derivative can be used as a diagnostics plot in PTA. During model match (of system identification), either pressure data or its derivative can be used to identify system properties. The same approach can be applied to rate derivative as well. In some cases, rate derivative and pressure derivative can exhibit different behaviors or can indicate the effect of certain reservoir properties at different times. In accordance with at least one embodiment, the actual data (pressure and rate) or their derivatives are automatically selected for model matching purposes based on the match quality (e.g., according to an objective function).

The type curve fitting used in PTA and material balance modelling of RTA is not ideal since they do not account for the presence of complex geology and fluid rock interaction that is present in actual reservoirs. These inadequacies have been addressed by introducing real geological models and reservoir simulators into the system identification of FIG. 1. Pressure Transient Analysis may be constrained by the test design to focus on specific reservoir zones of interest with the well flowing under ideal conditions (e.g., remaining above the bubble point) and for a short flowing time. The application of similar techniques to Rate Transient Analysis is not trivial, as these constraints are not present for RTA. RTA may have to account for many wells flowing multiple phases from many producing zones and this production data has a much longer duration than the transient pressure test. Consequently, there are many more reservoir parameters to be accounted for, both spatially and in terms of fluid saturations, and their nonlinear interaction can be accommodated during the system identification process.

Additionally, in complex reservoirs containing natural fractured systems, the PTA approach can be used to calibrate near-wellbore fracture parameters (conductivity, length, density etc.). During RTA, it is the interaction between the larger-scale networks of fractures, their orientation, and macro-scale features that become more meaningful. In accordance with some embodiments, these multiple scales are recognized and the iterative procedure outlined in this disclosure can be used to recover more information from pressure and rate measurements during modelling.

In some cases, the grid block properties of the geological model can be modified in such a way as to improve the match between the simulation and measured pressure data. In some embodiments, this functionality is extended to include the rate measurements. In common with the PTA approach of some modelling systems, the RTA takes into account a "Prior Model" which for RTA is the latest upscaled full-field history match together with the original geological model. To achieve the meaningful combination of PTA and RTA in one process, at least some embodiments use a reservoir model that runs efficiently at different time and length scales and where the reservoir properties updated in one transient analysis technique inform the properties of the other scale through efficient downscaling or upscaling, which may be facilitated by the gridding process generally noted above.

In addition to the multiple spatial scales of measurements, there tends to be meaningful differences in the standard deviation in the measured transient rate and pressure responses during a well test. Embodiments in accordance with the present disclosure may use both types of measured data (pressure and rate) along with their error estimates to produce system identification along with associated reservoir parameters. This iterative identification (shown in FIG. 1) exploits the different sensitivity of the underlying model parameters to the forward (PTA) and backward (RTA) analysis.

A mathematical algorithm used during the inversion process is a maximum likelihood estimator rather than the more typical method of least squares regression in at least some embodiments. Additionally this new approach can be applied sequentially to the measured pressure and rate data. For example, in accordance with certain embodiments, a method includes the following:

1) Analyzing a series of pressure build-up and/or drawdown tests to a given time using the measured rate history.
2) Determining the system, and determining model parameters using a maximum likelihood estimator (MLE).
3) Building the full history of the well bottom hole pressure using a pressure convolution equation:

$$p(t) = p_0 - \int_0^t \frac{dq}{d\tau}(\tau) p_u(t-\tau) d\tau$$
$$= p_0 - \int_0^t q(t-\tau) \frac{dp_u}{dt}(\tau) d\tau$$

where $p_u(t)$ is the unit rate impulse response of the well and reservoir model, p(t) is the simulated (output) pressure as a function of time t, and q(t) is the measured rate as a function of time t. Note that either form of the convolution integral can be used as convenient.

4) Repeating 1) and 2) using the pressure data as input with the measured rates the target of the MLE.
5) Building the full history of the well downhole rate using a rate convolution equation:

$$q(t) = \int_0^t q_u(t-\tau) \frac{d\Delta p(t)}{d\tau} dt$$

where $q_u(t)$ is the unit pressure change impulse response of the well and reservoir model, q(t) is the simulated (output) rate as a function of time t, and $\Delta p(t)$ is the measured change in pressure (e.g., with respect to an initial pressure) as a function of time.

6) Repeating 1)-5) for a later series of pressure build-ups and/or drawdowns.
7) Comparing the models and parameters to determine if the well or reservoir model is changing with time.

Figure 2:
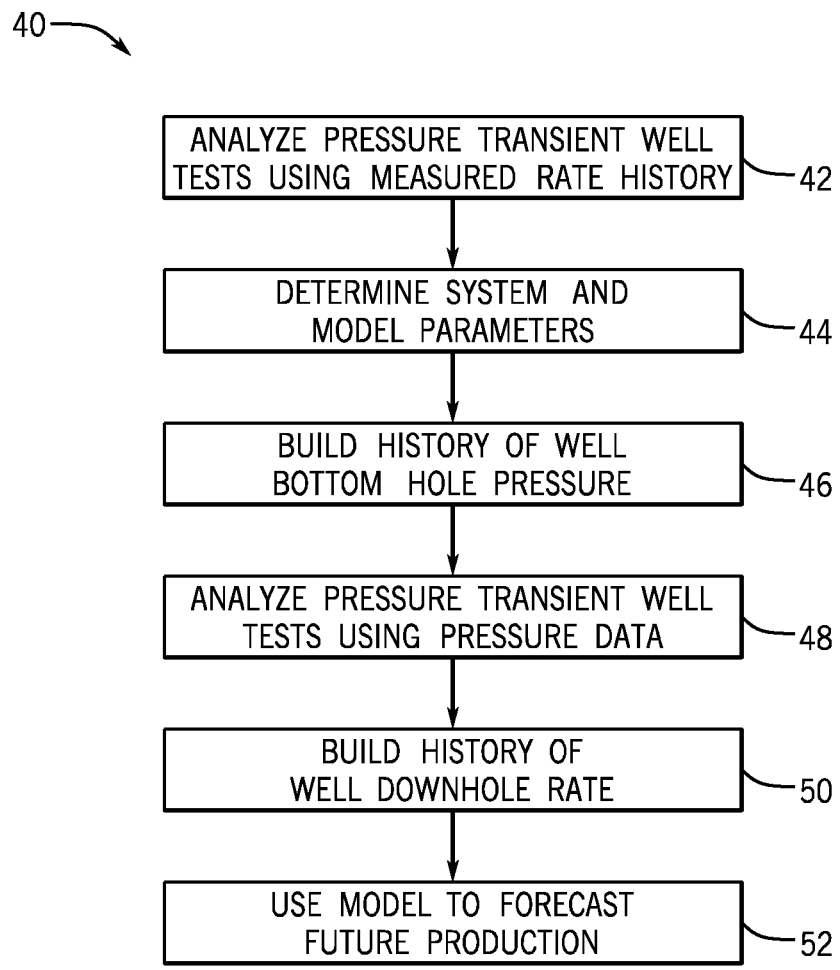
FIG. 2 is a flowchart representative of a process for forecasting future production from a well according to some embodiments.
Figure 3:
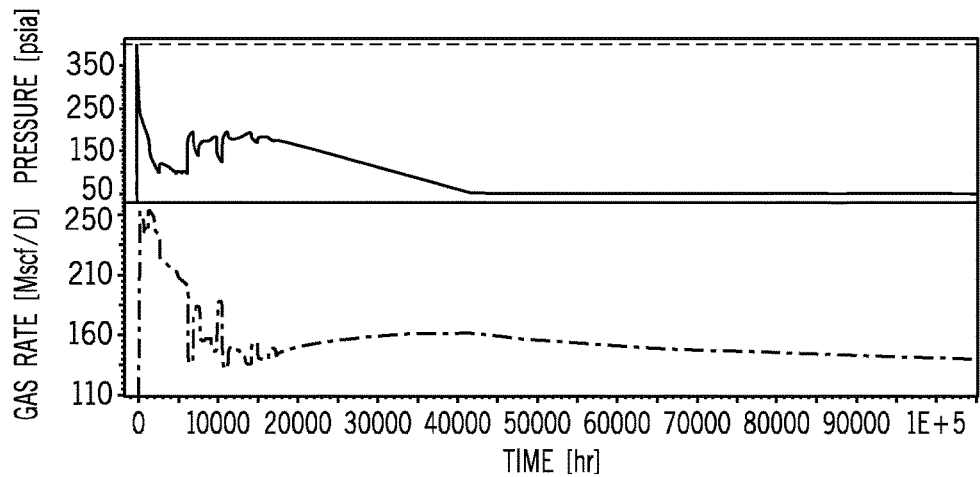
FIG. 3 shows a diagram of pressure and rate of a well over time using a naturally fractured reservoir model according to some embodiments.
Figure 4:
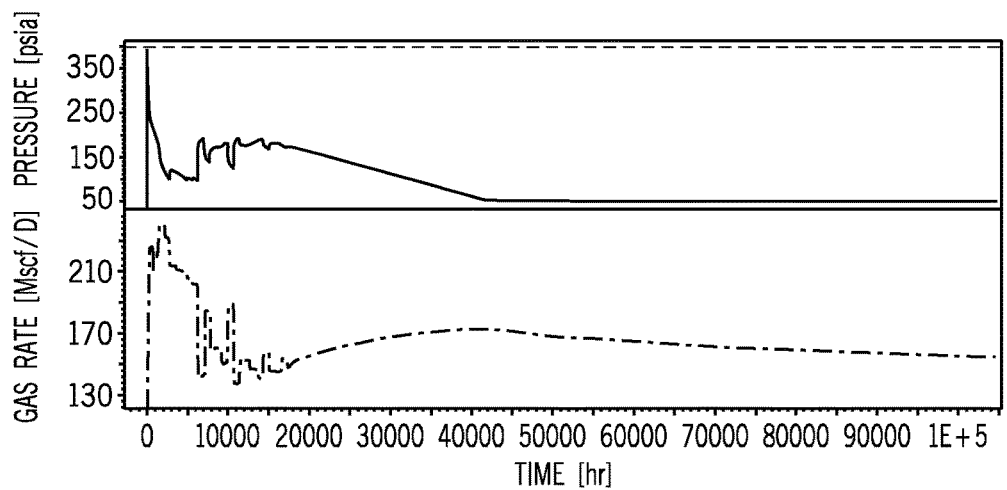
FIG. 4 shows a diagram of pressure and rate of a well over time using a dual-porosity pseudo-steady-state reservoir model according to some embodiments.

In accordance with the above description, one example of a method for modelling a well production forecast using a geological reservoir model is generally represented by flowchart 40 in FIG. 2. The method can include analyzing pressure transient well tests to a given time using a measured rate history as input (block 42) and determining a system type of the geological reservoir model and model parameters (block 44). The pressure transient well tests may include a series of pressure build-up and/or drawdown well tests, and determining the system type can include determining a flow regime of the well. In one embodiment, geological reservoir model parameters are determined using a maximum likelihood estimator. The method further includes building a history of bottom hole pressure for the well (block 46). This can be done using a suitable pressure convolution equation, such as those described above. Examples of the constructed history of bottom hole pressure are shown in the upper plots of FIGS. 3 and 4.

Additionally, the method includes analyzing the pressure transient well tests using pressure data (block 48) as input to the model to determine the system type of the geological reservoir model and to determine model parameters. The model parameters may be determined using the maximum likelihood estimator with measured flow rates as a target of the maximum likelihood estimator. Further, the pressure data used as input can include both measured pressures (e.g., measured during the pressure transient well tests) and simulated pressures (e.g., from the built history of the well bottom hole pressure noted above). A history of the well downhole flow rate can also be built (block 50). This downhole flow rate history can be built with a rate convolution equation, as described above. Examples of such a downhole flow rate history are shown in the lower plots of FIGS. 3 and 4.

Still further, the method includes using the geological reservoir model to forecast future production from the well (block 52). More specifically, this more detailed model and its parameters can be used to predict the rate response of the well into the future, i.e., production forecasting (see, e.g., FIG. 3). In at least some instances, the method may be repeated based on later testing (e.g., for a subsequent series of pressure transient tests) and the results can be compared to previous results to determine whether the well or reservoir model is changing with time. In one embodiment, pressures and flow rates measured during a later series of pressure build-up and/or drawdown well tests are compared to pressures and flow rates predicted by the geological reservoir model to assess predictive accuracy of the model. In at least some instances, the results of the workflow described above and the incorporation of any time dependency in the model parameters provide increased confidence in the production forecast. The presently disclosed techniques can be used with various reservoirs, but may be particularly suited to low-permeability reservoirs where the transient response of the well can last for years.

Figure 5:
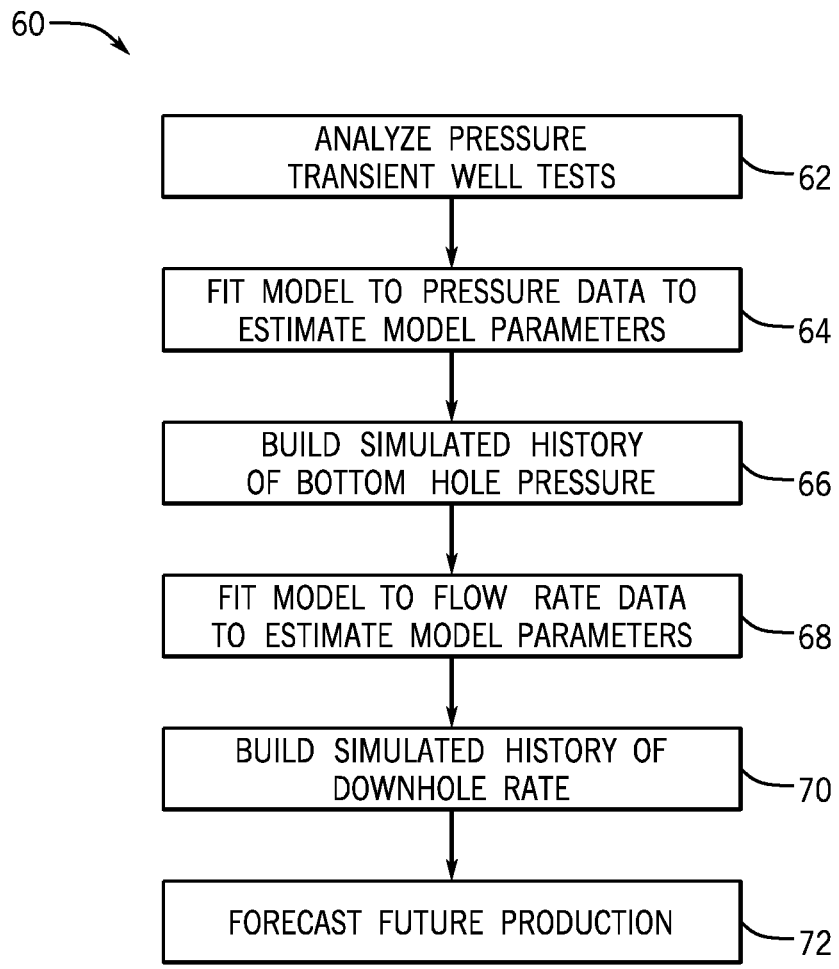
FIG. 5 is a flowchart representative of a process for well production forecasting using a geological reservoir model in accordance with some embodiments.

Another example of a method for well production forecasting in accordance with the description above is generally represented by flowchart 60 in FIG. 5. This method generally includes calibrating a geological reservoir model, which itself includes analyzing pressure transient well tests (block 62) providing measured transient flow rate and pressure data for a well, such as described above. The calibration also includes fitting the geological reservoir model to the measured transient pressure data, using the measured transient flow rate as input, to estimate certain parameters of the model (block 64). A simulated history of bottom hole pressure for the well is built based on the geological reservoir model and the measured transient flow rate data (block 66).

The calibration also includes using the measured transient pressure data and the simulated history of bottom hole pressure as input to fit the geological reservoir model to the measured flow rate data to estimate parameters of the model (block 68). The parameters estimated in this manner may include at least some of the parameters estimated by fitting the model to the measured pressure data, but may also include additional parameters not quantified in the prior estimation. The calibration may continue with building a simulated history of the downhole flow rate for the well based on the geological reservoir model and a change in the measured transient pressure data (block 70), such as described above. Future well production may be forecast using the calibrated geological reservoir model (block 72). As noted above, additional data may be used to update the model and to determine whether the model or the well are changing over time. In one embodiment, the additional data includes flow rates measured at certain periods with a series of production well tests.

Figure 6:
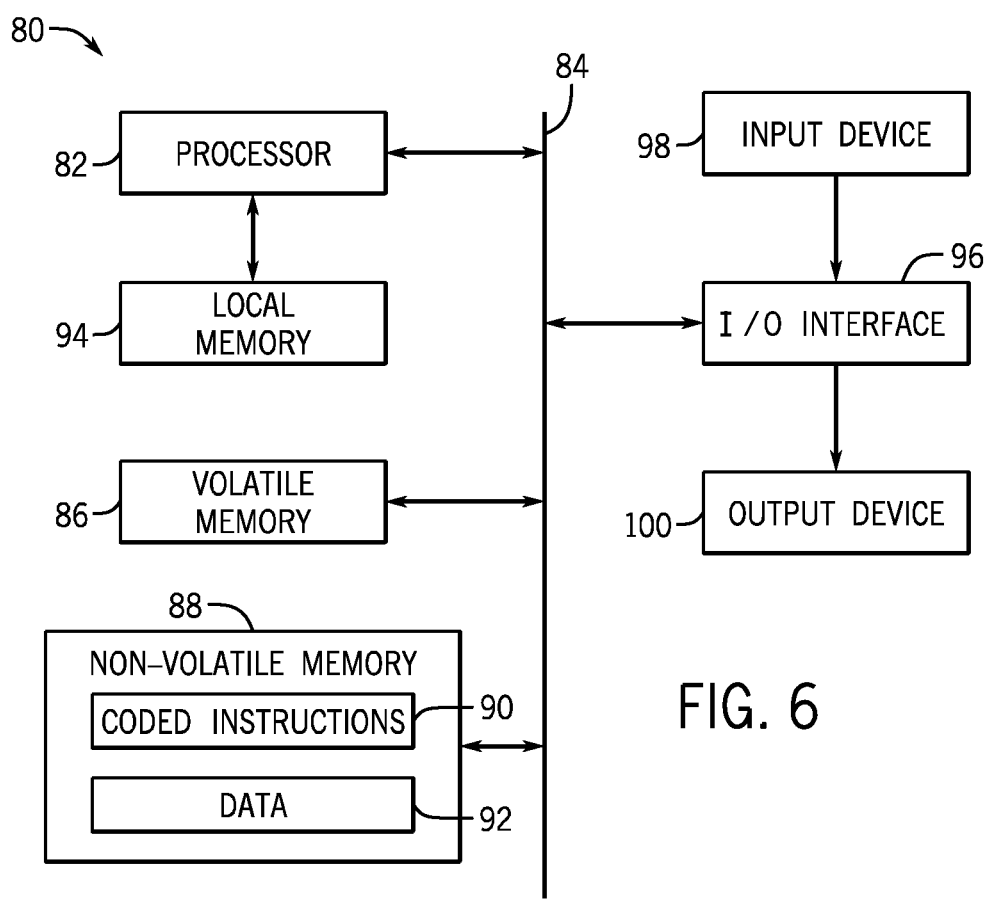
FIG. 6 is a block diagram generally depicting components of a programmed computer system for modelling a reservoir and forecasting future production in accordance with some embodiments.

It will be appreciated that a computer system can be programmed to facilitate performance of the above-described methods for modelling and production forecasting. An example of such a computer system is generally depicted in FIG. 6 in accordance with one embodiment. In this example, the computer system 80 includes a processor 82 connected via a bus 84 to volatile memory 86 (e.g., random-access memory) and non-volatile memory 88 (e.g., flash memory and a read-only memory (ROM)). Coded application instructions 90 and data 92 are stored in the non-volatile memory 88. For example, the application instructions 90 can be stored in a ROM and the data 92 can be stored in a flash memory. The instructions 90 and the data 92 may also be loaded into the volatile memory 86 (or in a local memory 94 of the processor) as desired, such as to reduce latency and increase operating efficiency of the computer system 80. The coded application instructions 90 can be provided as software that may be executed by the processor 82 to enable various functionalities described herein. Non-limiting examples of these functionalities include the modelling and well production forecasting described above. In at least some embodiments, the application instructions 90 are encoded in a non-transitory computer readable storage medium, such as the volatile memory 86, the non-volatile memory 88, the local memory 94, or a portable storage device (e.g., a flash drive or a compact disc).

An interface 96 of the computer system 80 enables communication between the processor 82 and various input devices 98 and output devices 100. The interface 96 can include any suitable device that enables this communication, such as a modem or a serial port. In some embodiments, the input devices 98 include a keyboard and a mouse to facilitate user interaction and the output devices 100 include displays, printers, and storage devices that allow output of data received or generated by the computer system 80, such as production forecasts. Input devices 98 and output devices 100 may be provided as part of the computer system 80 or may be separately provided.

Although the preceding description has been described herein with reference to particular means, materials and embodiments, it is not intended to be limited to the particulars disclosed herein; rather, it extends to functionally equivalent structures, methods, and uses, such as are within the scope of the appended claims.

What is claimed is:

1. A method for well production forecasting using measured transient flow rate and pressure data and a geological reservoir model, the method comprising:
    calibrating a geological reservoir model, the calibrating including:
        analyzing a series of pressure transient well tests providing measured transient flow rate and pressure data for a well;
        using the measured transient flow rate as input, fitting the geological reservoir model to the measured transient pressure data to estimate a first set of parameters for the geological reservoir model;
        after fitting the geological reservoir model to the measured transient pressure data, building a simulated history of bottom hole pressure for the well based on the geological reservoir model and the measured transient flow rate data;
        using the measured transient pressure data and the simulated history of bottom hole pressure as input, fitting the geological reservoir model to the measured transient flow rate data to estimate a second set of parameters for the geological reservoir model; and
        after fitting the geological reservoir model to the measured transient flow rate data, building a simulated history of downhole flow rate for the well based on the geological reservoir model and change in the measured transient pressure data; and
    forecasting future production from the well using the calibrated geological reservoir model.

2. The method of claim 1, wherein fitting the geological model to the measured transient pressure data to estimate the first set of parameters and fitting the geological model to the measured transient flow rate data to estimate the second set of parameters includes using a maximum likelihood estimator to determine values for the first and second sets of parameters.

3. The method of claim 1, wherein the second set of parameters includes at least some parameters of the first set of parameters and some additional parameters that are not part of the first set of parameters.

4. The method of claim 1, wherein building the simulated history of bottom hole pressure for the well based on the geological reservoir model and the measured transient flow rate data includes building the simulated history of bottom hole pressure for the well using a pressure convolution equation.

5. The method of claim 4, wherein the pressure convolution equation is expressible as:

$$p(t) = p_o - \int_0^t \frac{dq}{d\tau}(\tau) p_u(t-\tau) d\tau \text{ or}$$

$$p(t) = p_o - \int_0^t q(t-\tau) \frac{dp_u}{dt}(\tau) d\tau,$$

where p(t) is the simulated output pressure as a function of time t, $p_u(t)$ is the unit rate impulse response of the well and geological reservoir model, and q(t) is the measured transient flow rate as a function of time.

6. The method of claim 1, wherein building the simulated history of downhole flow rate for the well based on the geological reservoir model and the change in the measured transient pressure data includes building the simulated history of downhole flow rate for the well using a rate convolution equation.

7. The method of claim 6, wherein the rate convolution equation is expressible as:

$$q(t) = \int_0^t q_{up}(t-\tau) \frac{d\Delta p(\tau)}{d\tau} dt$$

where q(t) is the simulated output flow rate as a function of time t, $q_{up}(t)$ is the unit pressure change impulse response of the well and geological reservoir model, and $\Delta p(t)$ is the change in the measured transient pressure as a function of time.

8. The method of claim 1, comprising performing the series of pressure transient well tests.

9. The method of claim 8, wherein performing the series of pressure transient well tests includes performing at least one of pressure build-up well tests or drawdown well tests.

10. The method of claim 1, comprising performing a series of production well tests to measure flow rate at certain periods.

11. The method of claim 1, wherein the measured flow rate and pressure data have different time scales.

12. An apparatus comprising:
a computer system programmed to perform a method that includes:
 a) analyzing a series of pressure build-up and/or drawdown well tests for a well to a given time using a measured rate history;
 b) determining a system type of a geological reservoir model, and determining model parameters for the geological reservoir model using a maximum likelihood estimator;
 c) building a history of the well bottom hole pressure using a pressure convolution equation;
 d) analyzing the series of pressure build-up and/or drawdown well tests to the given time using pressure data as input to determine the system type of the geological reservoir model, and determining model parameters for the geological reservoir model using the maximum likelihood estimator with measured flow rates a target of the maximum likelihood estimator, wherein the pressure data used as input includes both pressures measured during the pressure build-up and/or drawdown well tests and simulated pressures from the history of the well bottom hole pressure built using the pressure convolution equation;
 e) building a history of the well downhole flow rate using a rate convolution equation; and
 f) using the geological reservoir model to forecast future production from the well.

13. The apparatus of claim 12, wherein the method that the computer system is programmed to perform also includes repeating a)-e) for a later series of pressure build-up and/or drawdown well tests, and comparing the system type and model parameters determined using the later series of pressure build-up and/or drawdown well tests to previous results to determine if the well or the geological reservoir model is changing with time.

14. The apparatus of claim 12, wherein the method that the computer system is programmed to perform also includes automatically selecting actual pressure or rate data, or their derivatives, based on match quality for determining the system type of the geological reservoir model.

15. The apparatus of claim 12, comprising a data acquisition system of the well capable of measuring pressure and flow rate during the series of pressure build-up and/or drawdown well tests.

16. A method for modelling a production forecast for a well using a geological reservoir model comprising:
 a) analyzing a series of pressure build-up and/or drawdown well tests to a given time using a measured rate history;
 b) determining a system type of a geological reservoir model, and determining model parameters for the geological reservoir model using a maximum likelihood estimator;
 c) building a history of the well bottom hole pressure using a pressure convolution equation;
 d) analyzing the series of pressure build-up and/or drawdown well tests to the given time using pressure data as input to determine the system type of the well, and determining model parameters for the geological reservoir model using the maximum likelihood estimator with measured flow rates a target of the maximum likelihood estimator, wherein the pressure data used as input includes both pressures measured during the pressure build-up and/or drawdown well tests and simulated pressures from the history of the well bottom hole pressure built using the pressure convolution equation;
 e) building a history of the well downhole flow rate using a rate convolution equation; and
 f) using the geological reservoir model to forecast future production from the well.

17. The method of claim 16, comprising repeating a)-e) for a later series of pressure build-up and/or drawdown well tests.

18. The method of claim 17, comprising comparing the system type and model parameters determined using the later series of pressure build-up and/or drawdown well tests to previous results to determine if the well or the geological reservoir model is changing with time.

19. The method of claim 17, comprising assessing predictive accuracy of the geological reservoir model by comparing pressures and flow rates measured during the later series of pressure build-up and/or drawdown well tests to pressures and flow rates predicted by the geological reservoir model.

20. The method of claim 16, wherein determining the system type of the geological reservoir model includes determining a flow regime of the well.

* * * * *